United States Patent [19]

Satoh et al.

[11] 4,148,967
[45] Apr. 10, 1979

[54] METALLIZED PLASTIC MOLDED PRODUCT AND METHOD FOR PRODUCING SAME

[75] Inventors: Mitsuo Satoh, Nagoya; Norio Miyagawa, Ohtake; Juichi Kobayashi, Aichi, all of Japan

[73] Assignee: Mitsubishi Rayon Co., Ltd., Tokyo, Japan

[21] Appl. No.: 895,582

[22] Filed: Apr. 12, 1978

[30] Foreign Application Priority Data

Apr. 20, 1977 [JP] Japan ................................. 52-45600

[51] Int. Cl.² .......................... B05D 3/06; B32D 15/08; B32D 27/30
[52] U.S. Cl. ................................. 428/416; 204/159.16; 204/159.19; 204/159.22; 204/159.23; 427/54; 427/409; 427/410; 427/407 C; 428/413; 428/418; 428/425; 428/461; 428/463; 428/458
[58] Field of Search .............. 428/425, 461, 463, 458, 428/413, 416, 418, 913; 204/159.19, 159.16, 159.22, 159.23; 427/54, 409, 410, 407

[56] References Cited

U.S. PATENT DOCUMENTS

| | | | |
|---|---|---|---|
| 3,850,770 | 11/1974 | Juna | 204/159.16 |
| 3,871,908 | 3/1975 | Spoor | 428/461 |
| 3,895,171 | 7/1975 | Deamund | 428/461 |
| 3,929,935 | 12/1975 | Kinstle | 204/159.16 |
| 3,953,309 | 4/1976 | Gilano | 204/159.16 |
| 3,959,521 | 5/1976 | Suetsugi | 428/425 |
| 4,025,407 | 5/1977 | Chang | 428/425 |
| 4,038,164 | 7/1977 | Via | 204/159.23 |
| 4,070,398 | 1/1978 | Lu | 428/425 |

Primary Examiner—Ellis Robinson
Attorney, Agent, or Firm—Oblon, Fisher, Spivak, McClelland & Maier

[57] ABSTRACT

A metallized plastic molded product is provided which comprises a plastic substrate, a base coat layer, a dry metallic film layer, an inter coat layer and a top coat layer, characterized in that said inter coat layer is a cured ultraviolet curing composition comprising 5-80% by weight of a resin containing 5-50% by weight of repeating unit represented by the formula I:

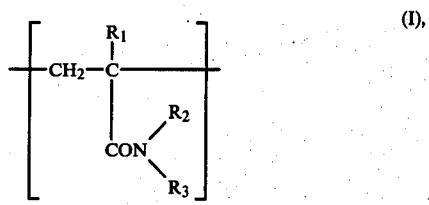

wherein $R_1$ is H or $CH_3$, $R_2$ is H or $C_{1-8}$ alkyl, and $R_3$ is $C_{1-8}$ alkyl, and having a molecular weight of 4,000–200,000 and 20–95% by weight of a compound having polymerizable unsaturated groups and said top coat layer is a cured ultraviolet curing composition comprising 40–90% by weight of a urethane modified polyvinyl compound and 10–60% by weight of a polyvinyl compound having a molecular weight of 170–1,000 and having at least two polymerizable unsaturated groups in one molecule. A method for producing the product is also provided.

12 Claims, No Drawings

METALLIZED PLASTIC MOLDED PRODUCT AND METHOD FOR PRODUCING SAME

BACKGROUND OF THE INVENTION

1. Field of the Invention

This invention relates to a metallized plastic molded product obtained by forming two protective films after base coat treatment and dry metallic film forming treatment and a method for producing same.

2. Description of the Prior Art

Hitherto, metallized plastic molded products comprising a plastic substrate which is subjected to a surface metallizing treatment have been used as various decorative articles, such as mirrors, and the like, utilizing the features of plastics such as high productivity, good moldability, light weight, and the like. Known metallizing methods include plating, hot-stamping, vacuum deposition, sputtering, ion plating, and the like. Especially, those which are produced by subjecting the surface of plastic substrates to chromium plating by a combination of chemical plating and electrical plating are widely used not only for interior decorative articles, but exterior automobile decorative articles. However, plating requires many and complicated steps and has problems in location of factories due to toxicity of plating solution and disposal of waste liquor and moreover it has the problem of high cost. On the other hand, the vacuum deposition method and the sputtering method are recognized as low cost and simple methods which have no waste liquor disposal problems.

The vacuum deposition method comprises subjecting the surface of a plastic substrate to a base coating treatment, a deposition treatment with metals such as aluminum, tin, and the like, in a high vacuum and then a top coating treatment, whereby a metallic appearance is imparted to the surface of the plastic molded product. The sputtering method comprises depositing atomic particles ejected from a target surface by sputtering on a substrate and requires a base coat layer and a top coat layer to obtain a beautiful appearance and high efficiency like the vacuum deposition method.

Plastic molded products on which aluminum is vacuum deposited are used as various interior decorative articles and those on which metals such as chromium, stainless steel and the like are vacuum deposited tend to be used as exterior automobile decorative articles in place of the products treated by plating methods. Furthermore, the sputtering method has also been examined to be used for the same purpose using stainless steel, chromium, and the like. However, exterior decorative parts to be substituted for those obtained by plating methods require high stain resistance, chemical resistance, solvent resistance, water resistance, corrosion resistance, wear resistance, heat resistance and weather resistance. Therefore, in the case of metallizing plastic molded products by vacuum deposition or the sputtering method, top coating materials which can provide said properties are required. Some thermosetting coating materials have such efficiency, but in view of the facts that the substrates are plastics low in heat resistance and that the coating materials must have strong adhesiveness to the metal layer, very few coating materials can be used. One example of such a material is two-pack urethane. In order to use a metallized plastic molded product having a protective coat of said urethane coating material as an exterior decorative article, a curing time of from 2 or 3 hours to one day is required at 70°–80° C. when the substrate is ABS resin. Nonetheless, cracks are apt to occur in the metal film layer to damage the appearance of the product. Thus, when thermosetting coating materials are used as protective coating materials for metallized plastic molded products treated by dry metal film forming methods such as vacuum deposition, sputtering and the like, there occur problems such as generation of cracks in the metal layer, long curing time, low productivity, high cost, and the like, and the thermosetting coating materials are not satisfactory as protective coating materials for exterior decorative metal film.

Ultraviolet curing coating materials which cure at ordinary temperatures in a short time overcome these defects of the thermosetting coating materials. Rapid curing at ordinary temperature is characteristic of ultraviolet curing coating materials, but they have a defect of low adhesiveness to metal due to their great volume shrinkage upon curing. Therefore, the conventional ultraviolet curing coating materials cannot be expected to provide a strong adhesiveness to a metal film layer. A need therefore continues to exist for ultraviolet curing coating materials having excellent adhesiveness to a metal film layer formed on a plastic molded product by dry type metal film forming methods such as vacuum deposition method or sputtering method and having excellent properties as coating materials for exterior decorative protective coating.

SUMMARY OF THE INVENTION

Accordingly, one object of the invention is to provide metallized plastic molded products excellent in adhesiveness, stain resistance, chemical resistance, solvent resistance, wear resistance, heat resistance, weather resistance, corrosion resistance, water resistance and appearance.

Another object of the invention is to provide ultraviolet curing coating materials having exterior decorative properties by suitable combination of compositions and blending of the coating materials and by using said ultraviolet curing coating materials to develop metallized plastic molded products having excellent properties which have never been attained by the conventional techniques.

Yet another object of the invention is to provide a method of producing metallized plastic molded products by forming two protective coating film layers with ultraviolet curing coating materials having exterior decorative properties on plastic molded products which have been subjected to base coating treatment and dry type metal film forming treatment.

Briefly, these objects and other objects of the invention as hereinafter will become more readily apparent can be attained by providing metallized plastic molded products produced by forming on a plastic substrate, (1) a base coat layer, (2) a metal film layer formed by a dry type method, (3) an inter coat layer and (4) a top coat layer, characterized in that said inter coat layer (3) comprises a cured ultraviolet curing composition comprising 5–80% by weight of a resin containing 5–50% by weight of the repeating unit represented by the formula I:

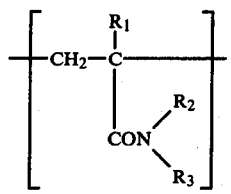

wherein $R_1$ is H or $CH_3$, $R_2$ is H or $C_{1-8}$ alkyl, and $R_3$ is $C_{1-8}$ alkyl, and having a molecular weight of 4,000–200,000 and 20–95% by weight of a compound having polymerizable unsaturated groups and said top coat layer (4) comprises a cured ultraviolet curing coating material comprising 40–90% by weight of a urethane modified polyvinyl compound or epoxy modified polyvinyl compound and 10–60% by weight of a polyvinyl compound having a molecular weight of 170–1000 and containing at least 2 polymerizable unsaturated groups per molecule.

DESCRIPTION OF THE PREFERRED EMBODIMENTS

The starting materials for the resin used as the inter coat layer in this invention are compounds represented by formula II:

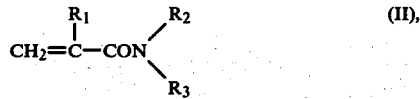

wherein $R_1$, $R_2$ and $R_3$ are the same as in formula I. Suitable such starting materials are N-methylacrylamide, N-ethylacrylamide, N-n-propylacrylamide, N-iso-propylacrylamide, N-n-butylacrylamide, N-iso-butylacrylamide, N-tert-butylacrylamide, N-amylacrylamide, N-hexylacrylamide, N-heptylacrylamide, N-octylacrylamide, N-2-ethylhexylacrylamide, N,N-dimethylacrylamide, N,N-diethylacrylamide, N,N-di-n-butylacrylamide, N-methylmethacrylamide, N-ethylmethacrylamide, N-n-propylmethacrylamide, N-n-butylmethacrylamide, N-tert-butylmethacrylamide, N-octylmethacrylamide, N-2-ethylhexylmethacrylamide, N,N-dimethylmethacrylamide, N,N-diethylmethacrylamide, N,N-di-n-butylmethacrylamide, and the like, or mixtures thereof, among which N-octylacrylamide is especially preferred. It is necessary for obtaining desired properties that copolymerization of these compounds be carried out so that they are contained in the resin in an amount of 5–50% by weight, preferably 5–40% by weight. When the amount is less than 5%, sufficient adhesiveness to metal layer is not obtained and when more than 50% water resistance decreases.

Compounds to be copolymerized with the compounds represented by the formula:

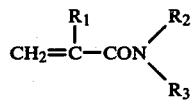

wherein $R_1$, $R_2$ and $R_3$ are the same as defined for formula I, include copolymerizable vinyl monomers. Suitable such comonomers include (meth)acrylic acid esters such as methyl(meth)acrylate, ethyl(meth)acrylate, butyl(meth)acrylate, 2-ethylhexyl(meth)acrylate, cyclohexyl(meth)acrylate, benzyl(meth)acrylate, 2-hydroxyethyl(meth)acrylate, 2-hydroxypropyl(meth)acrylate, glycidyl(meth)acrylate, tetrahydrofurfuryl(meth)acrylate, dimethylaminoethyl(meth)acrylate, diethylaminoethyl(meth)acrylate, and the like; styrene, α-methylstyrene, vinyltoluene, vinyl acetate, N-vinylpyrrolidone, and the like, or mixtures thereof.

Various polymerization methods such as solution polymerization, bulk polymerization, emulsion polymerization, suspension polymerization, and the like, may be used for producing resins for inter coating, among which solution polymerization, bulk polymerization and suspension polymerization are preferred, taking blending with polymerizable unsaturated compounds into consideration.

It is necessary that the inter coating resins have a molecular weight of 4,000–200,000, preferably 5,000–100,000. When the molecular weight is less than 4,000, sufficient wear resistance, solvent resistance, and weather resistance cannot be obtained and when more than 200,000 there are problems in compatibility with the polymerizable unsaturated compounds and in the coating operation.

Suitable compounds having polymerizable unsaturated groups which are used in the inter coat layer in this invention include unsaturated polyester resins, urethane modified polyvinyl compounds prepared by adding compounds having at least 2 hydroxyl groups, by urethanation reaction, to an addition reaction product of diisocyanate compounds and vinyl monomers having hydroxyl groups, epoxy modified polyvinyl compounds prepared by adding vinyl monomers having carboxyl groups to compounds having at least 2 epoxy groups by a ring opening esterification reaction, and polyvinyl compounds prepared by condensation of compounds having at least 2 hydroxyl groups and vinyl monomers having carboxyl groups. Mixtures of the foregoing may be used.

Regarding starting materials for production of the unsaturated polyester resins, suitable polyhydric alcohols include ethylene glycol, propylene glycol, 1,3-butylene glycol, 1,6-hexanediol, diethylene glycol, dipropylene glycol, neopentyl glycol, triethylene glycol, ester diols, hydrogenated bisphenol A, bisphenol dihydroxypropyl ether, and the like, among which neopentyl glycol, ester diol, hydrogenated bisphenol A, and the like are preferred for improving water resistance, chemical resistance and weather resistance; and polybasic acids such as phthalic anhydride, isophthalic acid, terephthalic acid, succinic anhydride, adipic acid, azelaic acid, sebacic acid, tetrahydrophthalic anhydride, hexahydrophthalic anhydride, tetrabromophthalic anhydride, tetrachlorophthalic anhydride, chlorendic anhydride, 3.4-end methylene tetrahydrophthalic anhydride, and for introduction of polymerizable double bonds into the main chain, maleic anhydride, fumaric acid, and the like, among whch phthalic anhydride is preferred when balanced properties are required, isophthalic acid is preferred when high water resistance, chemical resistance and mechanical strength are required, and long chain aliphatic dibasic acids such as adipic acid, sebacic acid, and the like are preferred when proper softness, shock resistance and crack resistance are required. Mixtures of the above components or polyesters may also be used.

Regarding starting materials for preparation of the urethane modified polyvinyl compounds, suitable diisocyanate compounds include tolylene diisocyanate, 4,4′-diphenylmethane diisocyanate, xylylene diisocyanate, hexamethylene diisocyanate, lysine diisocyanate, 4,4'-methylenebis-(cyclohexyl isocyanate), methylcyclohexane-2,4(2,6)-diisocyanate, 1,3-(isocyanatomethyl) cyclohexane, isophorone diisocyanate, trimethyl-hexamethylene diisocyanate, dimer acid diisocyanate, and the like. Aliphatic diisocyanates such as hexamethylene diisocyanate, lysine diisocyanate, trimethylhexamethylene diisocyanate, and the like, cycloaliphatic diisocyanates such as 4,4'-methylenebis(cyclohexyl isocyanate), methylcyclohexane-2,4(2,6)-diisocyanate, 1,3-(isocyanatomethyl)cyclohexane, isophorone diisocyanate, or xylylene diisocyanate which have weather resistance and yellowing resistance are preferred. Examples of vinyl monomers having hydroxyl groups are 2-hydroxyethyl acrylate, 2-hydroxypropyl acrylate, 2-hydroxy 3-methoxypropyl acrylate, 2-hydroxy-3-butoxypropyl acrylate, 2-hydroxy-3-(2-ethylhexyloxy)-propyl acrylate, 2-hydroxy-3-phenyloxypropyl acrylate, 2-hydroxyethyl methacrylate, 2-hydroxypropyl methacrylate, 2-hydroxy-3-methoxypropyl methacrylate, 2-hydroxy-3-butoxypropyl methacrylate, 2-hydroxy-3-(2-ethylhexyloxy)propyl methacrylate, 2-hydroxy-3-phenyloxypropyl methacrylate, and the like. Acrylate monomers are more preferred from the standpoint of curability by irradiation with ultraviolet rays. Suitable compounds having at least 2 hydroxyl groups are neopentyl glycol, hydrogenated bisphenol A, ester diol, bisphenoldioxypropyl ether, 2,2,4-trimethyl-1,3-pentanediol, 1,6-hexanediol, triethylene glycol, bisphenol dioxyethyl ether, and the like. Mixtures of diisocyanates and diols may be used.

Regarding starting materials for preparation of the epoxy modified polyvinyl compounds, suitable compounds having at least 2 epoxy groups include polyethylene glycol derivatives such as ethylene glycol diglycidyl ether, triethylene glycol diglycidyl ether, tetraethylene glycol diglycidyl ether, and the like, polypropylene glycol derivatives such as propylene glycol diglycidyl ether, tripropylene glycol diglycidyl ether, and the like, aliphatic derivatives such as neopentyl glycol diglycidyl ether, 1,6-hexanediol diglycidyl ether, and the like, cycloaliphatic glycidyl derivatives such as hydrogenated bisphenol A diglycidyl ether, cyclohexanediol diglycidyl ether, and the like, glycidylamine derivatives such as diglycidylaniline, diglycidylbenzylamine, 1,3-diglycidyl-5,5-dimethylhydantoin, and the like, 2,2-dibromoneopentyl glycol diglycidyl ether, bisphenol A diglycidyl ether, and the like, and mixtures thereof. Suitable vinyl monomers having carboxyl groups include acrylic acid, methacrylic acid, monoacryloxyethyl phthalate, monomethacryloxyethyl phthalate, monoacryloxyethyl hexahydrophthalate, monomethacryloxyethyl hexahydrophthalate, and the like, and mixtures thereof.

Regarding the starting materials for preparation of polyvinyl compounds obtained by condensation of compounds having at least 2 hydroxyl groups and vinyl monomers having carboxyl groups, the same polyhydric alcohols as used for preparation of the unsaturated polyester resins may be used as the compounds having at least 2 hydroxyl groups and the same vinyl monomers as used for preparation of the epoxy modified polyvinyl compounds may be used as the vinyl monomers having carboxyl groups.

The compounds having polymerizable unsaturated groups may be produced in accordance with the usual methods using the starting materials mentioned above and if necessary, catalysts, inhibitors, additives and the like. Furthermore, one or more of the vinyl monomers such as those mentioned with reference to copolymerizable vinyl monomers may be optionally added to the compounds having polymerizable unsaturated groups.

The content of the polymerizable unsaturated groups in the compounds having polymerizable unsaturated groups is preferably 1.5–11.5 per 1,000 molecular weight units considering various properties such as curability under irradiation with ultraviolets rays, hardness, flexibility, weather resistance, and the like. When the polymerizable unsaturated group content is less than 1.5, there are problems in curability, hardness, wear resistance, solvent resistance, and the like, and when more than 11.5, the strain in the cured coating film is great, adhesiveness to the metal layer is not sufficient, durability is low and cracks occur when the film is left outdoors.

The inter coating material is a mixture of a resin containing the repeating unit represented by the formula I and a compound having polymerizable unsaturated groups and the mixing ratio is such that the former is 5–80% by weight and the latter is 20–95% by weight and preferably the former is 10–50% by weight and the latter is 50–90% by weight. When the amount of the former is less than 5% by weight, adhesiveness of the coating material to a metal layer is not sufficient and when more than 80% by weight, hardness, wear resistance, solvent resistance, and weather resistance are insufficient and thus the coating material is not suitable as an inter coating material.

The inter coating material formulated as mentioned above, being different from the conventional ultraviolet curing type coating materials, has very excellent adhesiveness to the metal layer and not only has sufficient adhesiveness to a chromium plating film to which even two-pack urethane coating materials have insufficient adhesiveness, but does not require long curing time as required by the thermosetting type coating materials, typically the two-pack urethane coating materials, and thus can be cured into a film in a short time at ordinary temperature. Thus obtained coating film has excellent properties and can be satisfactorily used on exterior decorative parts, but such an inter coating film alone is not always sufficient and an additional top coat is necessary in order to obtain enhanced properties in articles to be used as substitutes for exterior decorative plated articles which must withstand severe conditions.

The top coating material for the top coat layer in the present invention is an ultraviolet curing type coating material comprising 40–90% by weight of a urethane modified polyvinyl compound or epoxy modified polyvinyl compound and 10–60% by weight of a polyvinyl compound which is lower in viscosity than said modified polyvinyl compounds, has a molecular weight of 170–1,000 and has at least 2 polymerizable unsaturated groups per molecule.

When the amount of the urethane or epoxy modified polyvinyl compound is less than 40% by weight, the coating material cannot be quickly cured in the air by irradiation with ultraviolet rays and the surface layer cannot possess adequate properties. When the amount is more than 90% by weight, the viscosity of the coating material increases, which requires a large amount of diluent for spray coating, which is not desirable in view of the need to prevent environmental pollution. Moreover, the coating surface is poor in smoothness, which causes problems in appearance.

The epoxy modified polyvinyl compound used in the top coating layer has preferably 2-10 polymerizable unsaturated groups per 1,000 molecular weight units. The urethane modified polyvinyl compound used in the top coating layer has preferably 1.8-10 polymerizable unsaturated groups per 1,000 molecular weight units.

Suitable starting materials for producing the urethane or epoxy modified polyvinyl compounds are the same as those for production of the inter coating material, and it is necessary when selecting the starting materials and producing the resins to consider that the objective coating materials are exterior decorative coating materials. Suitable polyvinyl compounds having a molecular weight of 170-1,000 and containing at least 2 polymerizable unsaturated groups per molecule are ethylene glycol di(meth)acrylate, diethylene glycol di(meth)acrylate, triethylene glycol di(meth)acrylate, neopentyl glycol di(meth)acrylate, 1,6-hexanediol di(meth)acrylate, trimethylolpropane tri(meth)acrylate, pentaerythritol tri(meth)acrylate, pentaerythritol tetra(meth)acrylate, bisphenol A dioxypropyl ether di(meth)acrylate, and the like, and mixtures thereof.

These compounds preferably can reduce the viscosity of epoxy or urethane modified polyvinyl compounds when they are mixed.

Thus formulated top coating materials can be easily coated with a small amount of spraying diluent, are excellent in smoothness, can be quickly cured by irradiation with ultraviolet rays in the air and can form a coating film having a firm three-dimensional structure and satisfying the exterior decorating standard on adhesiveness, wear resistance, weather resistance, solvent resistance, chemical resistance, water resistance and corrosion resistance.

When curing the inter coating material and top coating material by irradiation with ultraviolet rays, it is preferred to add to the coating materials a photopolymerization initiator, examples of which include benzophenone, 4,4'-bis(di-methylamino) benzophenone, benzoin, benzoinmethyl ether, benzoin-n-butyl ether, benzoin-iso-butyl ether, acetophenone, 2,2-diethoxyacetophenone, propiophenone, methylphenylglyoxylate, ethylphenylglyoxylate, phenanthraquinone, and the like. Preferably the photopolymerization initiator is added in an amount of 0.1-10 parts by weight per 100 parts by weight of solids in the coating material.

The top coating material used in this invention can be coated by any conventional coating methods, and at least one inert solvent as exemplified below may be used for coating depending on its suitability. Suitable such inert solvents include ester solvents such as ethyl acetate, butyl acetate, and the like, ketone solvents such as acetone, methylethylketone, methylisobutylketone, and the like, alcohol solvents such as ethyl alcohol, isopropyl alcohol, butyl alcohol, and the like, and aromatic solvents such as toluene, xylene, and the like, etc. Furthermore, the top coating material may contain polymeric or silicone coating surface improvers, flow improvers, various dyes, pigments, and the like, which are commonly added to conventional coating materials.

When said ultraviolet curing inter coating materials and top coating materials produced and formulated as mentioned above are protectively coated on the surface finished by dry type metal film forming methods such as vacuum deposition method, sputtering method, and the like, and are cured, the curing is completed by irradiation with ultraviolet rays for 1-30 seconds in the air at room temperature using a high pressure mercury lamp having an intensity of 80 W/cm and thus obtained metallized plastic molded products have a beautiful metallic appearance without cracks and have a protective film of two layers which firmly adheres to the metal layer and is excellent in weather resistance, wear resistance, water resistance, corrosion resistance, solvent resistance, chemical resistance, and the like. Therefore, they can be satisfactorily used as substitutes for plated exterior decorative parts. Furthermore, the method for producing metallized plastic molded products according to this invention uses simpler steps as compared with the conventional plating method and requires smaller amounts of solvent than the methods using thermosetting coating materials and so is favorable for prevention of environmental pollution. In addition, the coating materials used in this invention quickly cure at room temperature in the air and so large quantities of molded products can be treated.

As the base coating material used in this invention, either ultraviolet curing coating materials or thermosetting coating materials may be used and they can be selected depending on the particular dry type metal film forming method used, the type of metal to be coated, and the suitability of the coating, but the ultraviolet curing coating materials are preferred considering various factors such as the inter coating materials and top coating materials used.

An ultraviolet light source having an 1800°-4500 Å wavelength range is advantageously used. For example, sunlight, a low pressure mercury lamp, a moderate pressure mercury lamp, a high pressure mercury lamp, an ultra-high pressure mercury lamp, an arc lamp, a xenon lamp, a gallium lamp and the like may be used, but high pressure or ultrahigh pressure mercury lamps with 30-200 W/cm power outputs are preferred because they can cure the film in a short time and moreover are easily available.

Suitable plastic substrates include thermoplastic plastics such as AS resin, ABS resin, acrylic resin, polycarbonate resin, vinyl chloride resin, styrol resin, polyethylene, polypropylene, and the like, and thermosetting plastics such as urea resin, melamine resin, phenol resin, and the like.

Having generally described the invention, a more complete understanding can be obtained by reference to certain specific examples, which are included for purposes of illustration only and are not intended to be limiting unless otherwise specified.

EXAMPLE 1

(1) Production of Resin

| Starting materials | Part by weight |
|---|---|
| 1. Toluene | 500 |
| 2. Methylethylketone | 200 |
| 3. Styrene | 200 |
| 4. Ethyl acrylate | 400 |
| 5. Methyl methacrylate | 190 |
| 6. N-octylacrylamide | 100 |
| 7. Acrylic acid | 10 |
| 8. 2-Hydroxyethyl methacrylate | 100 |
| 9. Azobisisobutyronitrile | 25 |
| 10. Methylethyl ketone | 300 |

1. and 2. were charged in a flask provided with a stirrer, a condenser, a thermometer and a dropping funnel and the internal temperature was elevated to 90° C. When the internal temperature reached 90° C., a homogeneous mixture of 3.–9. was added drop by drop from the dropping funnel over a period of 4 hours. The internal temperature was kept at 90° C. during the addition. After completion of the drip addition, polymerization was continued for an additional 5 hours at 90° C. and then 10. was added and the internal temperature was decreased to room temperature. The molecular weight of thus obtained polymer was about 20,000 measured by high speed liquid chromatography (GPC). This polymer was called resin A.

(2) Production of Polymerizable Unsaturated Compound

| Starting materials | Part by weight |
| --- | --- |
| 1. 2,2,4-Trimethyl 1,3-pentanediol | 146 |
| 2. 2-Ethylhexyl acrylate | 188 |
| 3. Dimethylaminoethyl methacrylate | 6 |
| 4. Hydroquinone monoethyl ether | 3 |
| 5. Xylylene diisocyanate | 338 |
| 6. 2-Hydroxypropyl acrylate | 260 |

1.–4. were charged in a flask provided with a stirrer, a condenser, a thermometer and a dropping funnel and the internal temperature was raised to 60° C. When the internal temperature reached 60° C., 5. was drip fed thereto over a period of 1 hour and the content was kept at 60° C. for additional 1 hour. Then, 6 was drip fed thereto over a period of 1 hour. Thereafter, the content was stirred at said temperature for 4 hours and the reaction was discontinued when it was confirmed that the remaining NCO group was not more than 0.2%. The resultant compound was called compound A.

(3) Preparation of Inter Coating Material

| Starting materials | Part by weight |
| --- | --- |
| Resin A | 55 |
| Compound A | 72.5 |
| 2,2-Diethoxyacetophenone | 2 |
| Xylene | 100 |

The above starting materials were introduced into a clean stainless steel vessel and were homogeneously stirred and mixed.

(4) Preparation of Top Coating Material

| Starting materials | Part by weight |
| --- | --- |
| Compound A | 70 |
| Trimethylolpropane triacrylate | 30 |
| 2,2-Diethoxyacetophenone | 2 |
| Xylene | 50 |

The above starting materials were introduced into a clean stainless steel vessel and were homogeneously stirred and mixed.

(5) Production of Metallized Plastic Molded Material

An ultraviolet curing type under coating material comprising 50 parts by weight of a compound (compound B) obtained by reaction of 190 parts by weight of bisphenol A type epoxy resin (epoxy equivalent 190), 72 parts by weight of acrylic acid, 2.6 parts by weight of tributylamine and 0.3 part by weight of hydroquinone monomethyl ether at 95° C. for 6 hours, 10 parts by weight of trimethylolpropane triacrylate, 40 parts by weight of 1,6-hexanediol diacrylate, 100 parts by weight of methyl methacrylate and 2 parts by weight of benzoin isobutyl ether was coated on an ABS resin substrate to a thickness of 10μ by spray method and this was irradiated with a high pressure mercury lamp of 80 W/cm positioned at a distance of 20 cm above the sample for 15 seconds in the air. Then, nichrome was deposited on said molded material to a thickness of about 0.1μ by a vacuum deposition method to obtain a molded material having a very attractive lustrous metal surface.

On thus obtained nichrome deposited ABS resin molded material was coated the inter coating material obtained in step (3) to a thickness of 15μ by a spray method and this was irradiated with a high pressure mercury lamp of 80 W/cm positioned at a distance of 20 cm above the molded material for 5 seconds in the air. Then, the top coating material obtained in step (4) was coated therein to a thickness of 15μ by a spray method and this was irradiated with a high pressure mercury lamp of 80 W/cm positioned at a distance of 20 cm above the molded product for 15 seconds in the air to form a protective coating comprising the two layers.

The thus obtained metallized ABS resin molded product had a very attractive metallic luster. This was evaluated by the following exterior decorative standards to obtain the excellent results as shown in Table 1.

Table 1

| Evaluated items | Evaluating methods or conditions | Results of evaluation |
| --- | --- | --- |
| Hardness | Mitsubishi pencil unit | H |
| Adhesiveness | Peel test with adhesive cellophane tape in squares | 100/100 |
| Heat resistance | 80° C., 24 hours | Appearance did not change. Secondary adhesion passable |
| Water resistance | 50° C., 96 hours | Appearance did not change. Secondary adhesion passable |
| Moisture resistance | 50° C., 100% RH. 96 hours | Appearance did not change. Secondary adhesion passable |
| Salt spray | 5% NaCl, 35° C., 240 hours | Appearance did not change. Secondary adhesion passable |
| Weather resistance | Sunshine weatherometer 600 hours | Appearance did not change. Secondary adhesion passable |
| Acid resistance | 5% H$_2$SO$_4$, 20° C., 24 hours | Appearance did not change. |

Table 1-continued

| Evaluated items | Evaluating methods or conditions | Results of evaluation |
|---|---|---|

| Evaluation items | Evaluating methods or conditions | Results of evaluation |
|---|---|---|
| Alkali resistance | 5% NaOH, 20° C., 24 hours spot | Appearance did not change. |
| Gasoline resistance | Dipped in Nisseki regular gasoline at 20° C., for 24 hours | Appearance did not change. |
| Wear resistance | Taper abrasion test, load 500g, CS-10 abrasion ring, 500 times | Passable |

EXAMPLE 2

(1) Production of Resin ... Same as the Resin A in Example 1.

(2) Production of Polymerizable Unsaturated Compound.

250 parts by weight of hydrogenated bisphenol A diglycidyl ether, 72 parts by weight of acrylic acid, 3 parts by weight of tributylamine and 0.3 parts by weight of hydroquinonemonoethyl ether were introduced into a flask provided with a stirrer and a condenser and were allowed to react at 95° C. for 6 hours to obtain compound C.

(3) Preparation of Inter Coating Material

| Starting material | Part by weight |
|---|---|
| Resin A | 50 |
| Compound C | 55 |
| 1,6-Hexanediol diacrylate | 20 |
| Benzoinisobutyl ether | 2 |
| Butyl acetate | 20 |
| Xylene | 40 |

These starting materials were introduced into a clean stainless steel vessel and homogeneously mixed and stirred.

(4) Preparation of Top Coating Material ... Same as in Example 1.

(5) Production of Metallized Plastic Molded Product.

On an ABS resin molded product having a cured coat of under coating material which was the same as that of Example 1 was deposited stainless steel to a thickness of 0.1μ by vacuum deposition method to obtain a metallized ABS resin molded product having an attractive luster.

On the thus obtained ABS resin molded product on which stainless steel was vacuum deposited was coated the inter coating material obtained in step (3) to a thickness of 15μ by a spray method and this was irradiated with a high pressure mercury lamp of 80 W/cm positioned at a distance of 20 cm above it for 15 seconds in the air. Then, on said coating was coated the same top coating material as in Example 1 to a thickness of 15μ, which was irradiated with a high pressure mercury lamp of 80 W/cm positioned at a distance of 20 cm above the molded product to form, a protective coat comprising two layers. The resultant metallized ABS resin molded product had beautiful metallic luster.

This molded product was evaluated in the same manner as in Example 1 to obtain good results.

EXAMPLE 3

On an ABS resin molded product having cured coat of the same under coating material as in Example 1 was deposited stainless steel to a thickness of 0.07μ by a sputtering method. Then, the same inter coating material and top coating material as in Example 1 were coated thereon and cured in the same manner as in Example 1 to form a protective coating comprising two layers. The resultant metallized ABS resin molded product had beautiful metallic luster and when this was evaluated by the same exterior decorative standards as in Example 1 excellent results were obtained.

EXAMPLE 4

(1) Production of Resin

| Starting materials | Part by weight |
|---|---|
| 1. Toluene | 500 |
| 2. Methyl ethyl ketone | 200 |
| 3. Styrene | 200 |
| 4. 2-Ethylhexyl acrylate | 400 |
| 5. Methyl methacrylate | 200 |
| 6. N,N-dimethylacrylamide | 100 |
| 7. n-Butyl methacrylate | 100 |
| 8. Azobisisobutyronitrile | 25 |
| 9. Methyl ethyl ketone | 300 |

1. and 2. were charged in a flask provided with a stirrer, a condenser, a thermometer and a dropping funnel and internal temperature was raised to 90° C. When the internal temperature reached 90° C., 3.-8. were homogeneously mixed and added from the dropping funnel over a period of 4 hours. During the addition, the internal temperature was kept at 90° C. After completion of the addition, polymerization was continued for further 7 hours at 90° C. and then 9. was added and the internal temperature was dropped to room temperature. The resultant polymer had a molecular weight of about 35,000 measured by high speed liquid chromatography (GPC). This was called resin B.

(2) Production of Polymerizable Unsaturated Compound

| Starting materials | Part by weight |
|---|---|
| 1. Maleic anhydride | 196 |
| 2. Isophthalic acid | 166 |
| 3. Ester diol 204* | 220 |
| 4. Neopentyl glycol | 262 |

*Ester diol 204
2,2-dimethyl-3-hydroxypropyl
2,2-dimethyl-3-hydroxypropionate

The above 1.-4. were charged in a flask provided with a stirrer, a thermometer, a partial condenser, a total condenser and a nitrogen gas inlet pipe and reaction was continued at 210° C. while passing nitrogen gas therethrough and removing condensation water and completed at an acid value of 5. After completion of the reaction, the reaction product was diluted with styrene so that the solid matter was 70%. The resultant unsaturated polyester was called compound D.

(3) Preparation of Inter Coating Material

| Starting materials Z | Part by weight |
| --- | --- |
| Resin B | 40 |
| Compound C | 30 |
| Comound D | 40 |
| Neopentyl glycol diacrylate | 10 |
| Benzophenone | 2 |
| Toluene | 40 |
| Ethyl acetate | 20 |

The above starting materials were introduced into a clean stainless steel vessel and homogeneously mixed and stirred.

(4) Preparation of Top Coating Material

| Starting materials | Part by weight |
| --- | --- |
| Compound C | 80 |
| Triethylene glycol diacrylate | 20 |
| Benzoinisobutyl ether | 2 |
| Toluene | 50 |

The above starting materials were introduced into a clean stainless steel vessel and homogeneously mixed and stirred.

(5) Production of Metallized Plastic Molded Product 116 parts by weight of 2-hydroxyethyl acrylate, 148 parts by weight of phthalic anhydride, 2 parts by weight of tributylamine and 0.4 part by weight of hydroquinone monomethyl ether were introduced into a flask provided with a stirrer, a thermometer, and a condenser and were allowed to react at 95° C. until acid value reached 216. Then, 330 parts of bisphenol A type epoxy resin having an epoxy equivalent of 330 was charged therein and these were allowed to react at 95° C. until the acid value became less than 5 to obtain compound E. An under coating material comprising 60 parts by weight of said compound E, 40 parts by weight of neopentyl glycol diacrylate, 40 parts by weight of methyl methacrylate, 60 parts by weight of toluene and 2 parts by weight of benzoinisobutyl ether was coated on an ABS resin molded product to a film thickness of 12$\mu$ by spray method and was irradiated with a high pressure mercury lamp of 80 W/cm positioned at a distance of 20 cm above the molded product for 20 seconds in the air. Then, on this molded product was deposited aluminum to a thickness of about 0.15$\mu$ by a vacuum deposition method to obtain a metallized ABS resin molded product having an attractive luster.

The inter coating material of step (3) was coated on the aluminum deposited ABS resin molded product obtained in step (5) to a thickness of 12$\mu$ and this was irradiated with a high pressure mercury lamp of 80 W/cm positioned at a distance of 20 cm above the molded product for 10 seconds in the air. Then, the top coating material of step (4) was coated thereon to a thickness of 15$\mu$ and irradiated with a high pressure mercury lamp of 80 W/cm positioned at a distance of 20 cm above the molded product for 20 seconds in the air to obtain a protective coat comprising two layers. The resultant molded product had beautiful metallic luster and this was evaluated by the same exterior decorative standards as in Example 1 to obtain excellent results.

EXAMPLE 5

On an ABS resin molded product on which the same under coating material as in Example 1 was coated and cured was deposited tin to a thickness of 0.15$\mu$ by vacuum deposition method. On said coating were coated the same inter coating material and top coating material as those in Example 4 and cured under the same conditions as in Example 4 to form a protective coat comprising two layers. The resultant molded product had an attractive luster and this was evaluated by the same exterior decorative standards as in Example 1 to obtain excellent results.

EXAMPLE 6

(1) Production of resin . . . The same as resin B in Example 4

(2) Production of polymerizable unsaturated compound.

Step 1

| | Starting materials | Part by weight |
| --- | --- | --- |
| 1. | Isophthalic acid | 166 |
| 2. | 2,2-Dimethyl-3-hydroxypropyl 2,2-dimethyl-3-hydroxypropionate | 449 |

The above starting materials 1. and 2. were charged in a flask provided with a stirrer, a thermometer, a partial condenser, a total condenser and a nitrogen gas inlet pipe and they were allowed to react at 210° C. for 5 hours while passing nitrogen therethrough and removing condensation water to complete the reaction at an acid value of 0.5.

Step 2

| | Starting materials | Part by weight |
| --- | --- | --- |
| 1. | Polyester from step 1 | 600 |
| 2. | Acrylic acid | 58 |
| 3. | Hydroquinone | 3 |
| 4. | Concentrated sulfuric acid | 10 |
| 5. | Toluene | 100 |

The starting materials 1.-5. were charged in a flask provided with a stirrer, a thermometer and Dean Stark type trap and were allowed to react at 95°-100° C. under reduced pressure while removing condensation water. The reaction was discontinued when condensation water was no longer produced and unreacted acrylic acid, hydroquinone and concentrated sulfuric acid were removed by washing with alkali and water. Thereafter, toluene was removed to obtain a polyester acrylate which was called compound F.

(3) Preparation of inter coating material

| Starting materials | Part by weight |
| --- | --- |
| Resin B | 60 |
| Compond F | 60 |
| Diethylene glycol diacrylate | 10 |
| 2,2-diethoxyacetophenone | 2 |

| Starting materials | Part by weight |
| --- | --- |
| Xylene | 30 |
| Toluene | 40 |

The above starting materials were introduced into a clean stainless steel vessel and were homogeneously mixed and stirred.

(4) Preparation of top coating material . . . The same as in Example 4.

(5) Production of metallized plastic molded product

On an ABS resin molded product on which the same under coating material as in Example 4 was coated and cured was deposited antimony to a thickness of 0.1μ by vacuum deposition method. Then, the inter coating material of step (3) was coated thereon to a thickness of 15μ by spray method and irradiated with a high pressure mercury lamp of 80 W/cm positioned at a distance of 20 cm above the molded product for 10 seconds in the air. Then, the top coating material of Example 4 was coated thereon to a thickness of 15μ by spray method and irradiated with a high pressure mercury lamp of 80 W/cm positioned at a distance of 20 cm above the molded product for 20 seconds in the air to form a protective coat comprising two layers. The resultant metallized ABS resin molded product had an attractive metallic luster and this was evaluated by the same exterior protective standards as in Example 1 to obtain excellent results.

EXAMPLE 7

(1) Production of resin

| | Starting materials | Part by weight |
| --- | --- | --- |
| 1. | Ethyl acrylate | 20 |
| 2. | Methyl methacrylate | 10 |
| 3. | Styrene | 30 |
| 4. | N-2-ethylhexylmethacrylamide | 20 |
| 5. | n-Butyl methacrylate | 20 |
| 6. | Benzoyl peroxide | 2 |
| 7. | Tert-dodecylmercaptan | 1 |
| 8. | 1% aqueous solution of partially saponified polyvinyl alcohol | 200 |

The starting material 8. was introduced into a flask provided with a stirrer, a thermometer and a condenser and then 1.–7. were introduced thereinto, dispersed and suspended therein. They were allowed to react at 90° C. for 6 hours to obtain a bead-like polymer. This polymer was washed with water and dried and was dissolved in toluene so that solid matter was 50%. This polymer had a molecular weight of about 15,000 measured by GPC. This was called resin C.

(2) Production of polymerizable unsaturated compound. . . . Same as compound A in Example 1 and compound F in Example 6.

(3) Preparation of inter coating material

| | Starting materials | Part by weight |
| --- | --- | --- |
| 1. | Resin C | 60 |
| 2. | Compound A | 40 |
| 3. | Compound F | 25 |
| 4. | 1,6-Hexanediol diacrylate | 5 |
| 5. | Benzophenone | 2 |
| 6. | Xylene | 60 |

| | Starting materials | Part by weight |
| --- | --- | --- |
| 7. | Methyl ethyl ketone | 40 |

The above starting materials 1.–7. were introduced into a clean stainless steel vessel and were homogeneously mixed and stirred.

(4) Preparation of top coating material . . . Same as in Example 1.

(5) Production of metallized plastic molded product

An ultraviolet curing under coating material comprising 60 parts by weight of compound B, 30 parts by weight of pentaerythritol pentaacrylate, 10 parts by weight of neopentyl glycol, 2 parts by weight of benzoinisobutyl ether and 50 parts by weight of methyl methacrylate was coated on an ABS resin molded product to a thickness of 10μ by spray method and this was irradiated with a high pressure mercury lamp of 80 W/cm positioned at a distance of 20 cm above the coated molded product for 15 seconds in the air. Then, chromium was deposited to a thickness of about 0.06μ on said molded product by sputtering method to obtain a metallized ABS resin molded product having an attractive luster.

On said chromium sputtering treated ABS resin molded product obtained in step (5) was coated the inter coating material obtained in step (3) to a thickness of 20μ by spray method. Then, this was irradiated with a high pressure lamp of 80 W/cm positioned at a distance of 20 cm above the coated molded product for 10 seconds. Subsequently, the top coating material of Example 1 was coated thereon to a thickness of 10μ by spray method and irradiated with a high pressure mercury lamp of 80 W/cm positioned at a distance of 20 cm above the molded product for 15 seconds to form a protective coat comprising two layers. The resultant molded product had an attractive metallic luster. This was evaluated by the same exterior protective standards to obtain excellent results.

EXAMPLE 8

The same under coating material as in Example 4 was coated on a polymethacrylic resin to a thickness of 10μ and cured. Then, an aluminum-tin alloy (aluminum 80% by weight and tin 20% by weight) was deposited thereon to a thickness of about 0.15μ by vacuum deposition method to obtain a molded product having an attractive metallic luster. Then, a protective coat comprising two layers was formed thereon using the same inter coating material and top coating material as in Example 1 under the same coating and curing conditions as in Example 1.

The resultant metallized polymethacrylic resin had an attractive metallic luster. This was evaluated by the same exterior decorative standards to obtain excellent results.

EXAMPLE 9

An ultraviolet curing under coating material comprising 50 parts by weight of compound B, 40 parts by weight of neopentyl glycol, 10 parts by weight of compound E, 2 parts by weight of benzophenone, and 100 parts by weight of toluene was coated on a polystyrol resin molded product to a thickness of 10μ and was cured. Then, stainless steel was deposited thereon to a thickness of 0.05μ by sputtering method. Furthermore, a protective coat comprising two layers was formed thereon using the same inter coating material and top coating material as in Example 1 under the same coating and curing conditions as in Example 1 to obtain a molded product having an attractive metallic luster. This was evaluated by the same standards as in Example 1 to obtain excellent results.

EXAMPLE 10

An ultraviolet curing under coating material comprising 80 parts by weight of compound C, 20 parts by weight of 1,6-hexanediol diacrylate, 2 parts by weight of benzoinisobutyl ether, 60 parts by weight of toluene and 40 parts by weight of butyl acetate was coated on a polyvinyl chloride resin molded product to a film thickness of 15μ and was cured. Then, antimony was deposited thereon to a thickness of 0.1μ by vacuum deposition method. Subsequently, a protective coat comprising two layers was formed thereon using the same inter coating material as in Example 7 and the same top coating material as in Example 4 under the same conditions as in Example 7 and Example 4, respectively, to obtain a molded product having an attractive metallic luster. This was evaluated by the same standards as in Example 1 to obtain excellent results.

EXAMPLE 11

An under coating material comprising 100 parts by weight of acryl polyol (solid matter 50%) having an OH value of 40, prepared from 2-hydroxypropyl methacrylate, acrylic acid, styrene, methyl methacrylate and n-butyl methacrylate, 12 parts by weight of xylylene diisocyanate and 100 parts by weight of butyl acetate, was coated on an ABS resin molded product to a film thickness of 10μ and was baked at 75° C. for 4 hours. Then, aluminum was deposited thereon to a thickness of 0.15μ by vacuum deposition method. Subsequently, a protective coat comprising two layers was formed thereon using the same inter coating material and top coating material as in Example 4 under the same coating and curing conditions as in Example 4 to obtain a molded product having an attractive metallic luster. This was evaluated by the same standards as in Example 1 to obtain excellent results.

EXAMPLE 12

The same under coating material as in Example 11 was coated and cured on an ABS resin molded product under the same conditions as in Example 11. Then, nichrome was deposited thereon to a thickness of 0.15μ by vacuum deposition method. Subsequently, a protective coat was formed thereon using the same inter coating material and top coating material as in Example 1 under the same coating and curing conditions as in Example 1 to obtain a molded product having an attractive metallic luster. This was evaluated by the same standards as in Example 1 to obtain excellent results.

COMPARATIVE EXAMPLE 1

(1) Production of resin

Polymer was produced in the same manner as in production of resin A in Example 1 except that N-octylacrylamide was omitted. This polymer was called resin D. This resin had a molecular weight of about 20,000 measured by GPC.

(2) Production of polymerizable unsaturated compound ... Same as in Example 1.

(3) Preparation of inter coating material

The inter coating material was prepared in the same manner as in Example 1 except that resin A was replaced by resin D.

(4) Production of metallized plastic molded product

Nichrome was deposited on an ABS resin molded product in the same manner as in Example 1 and the inter coating material of step (3) was coated thereon to a film thickness of 15μ by spray method. This was irradiated with a high pressure mercury lamp of 80 W/cm positioned at a distance of 20 cm thereabove for 5 seconds in the air. Then, the same top coating material as in Example 1 was coated thereon to a thickness of 15μ by spray method and irradiated with ultraviolet ray from a high pressure mercury lamp of 80 W/cm positioned at a distance of 20 cm thereabove for 15 seconds in the air to form a protective coat comprising two layers.

The resultant molded product was evaluated by the same conditions as in Example 1 to obtain the following results.

Table 2

| Evaluated items | Results of evaluation |
| --- | --- |
| Hardness | H |
| Adhesiveness | 95/100 |
| Heat resistance | Appearance did not change. Secondary adhesion —passable |
| Water resistance | Blister occurred. Secondary adhesion —unpassable |
| Moisture resistance | Blister occurred. Secondary adhesion —unpassable |
| Evaluated items | Results of evaluation |
| Salt spray | Appearance did not change. Secondary adhesion —unpassable |
| Weather resistance | Appearance did not change. Secondary adhesion —unpassable |
| Acid resistance | No change |
| Alkali resistance | No change |
| Gasoline resistance | No change |
| Wear resistance | No change |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A metallized plastic molded product which comprises a molded plastic substrate and (1) a base coat layer, (2) a dry metal film layer, (3) an inter coating layer and (4) a top coating layer, characterized in that said inter coating layer (3) is a cured layer of an ultraviolet curing composition comprising 5–80% by weight of a resin which contains 5–50% by weight of the repeating unit represented by the formula I:

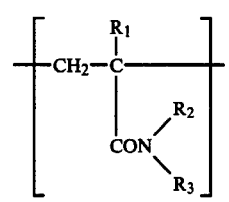

wherein $R_1$ is H or $CH_3$, $R_2$ is H or $C_1$–$C_8$ alkyl, and $R_3$ is $C_1$–$C_8$ alkyl, and which has a molecular weight of 4,000–200,000 and 20–95% by weight of a compound having polymerizable unsaturated groups and said top coating layer (4) is a cured layer of an ultraviolet curing composition comprising 40–90% by weight of a urethane modified polyvinyl compound or an epoxy modified polyvinyl compound and 10–60% by weight of a polyvinyl compound which has a molecular weight of 170–1,000 and contains at least 2 polymerizable unsaturated groups per molecule.

2. The metallized plastic molded product of claim 1, wherein said resin used in said inter coating layer has the repeating unit of said formula I wherein $R_1$ and $R_2$ are hydrogen and $R_3$ is octyl.

3. The metallized plastic molded product of claim 1, wherein said compound having polymerizable unsaturated groups and used in said inter coating layer is at least one compound selected from the group consisting of unsaturated polyester compounds, urethane modified polyvinyl compounds, epoxy modified polyvinyl compounds and polyvinyl compounds obtained by condensation of compounds having at least 2 hydroxyl groups and vinyl monomers having carboxyl groups.

4. The metallized plastic molded product of claim 1, wherein said compound having polymerizable unsaturated groups and used in said inter coating layer has 1.5–11.5 polymerizable unsaturated groups per 1,000 molecular weight units.

5. The metallized plastic molded product of claim 1, wherein said epoxy modified polyvinyl compound used in said top coating layer has 2–10 polymerizable unsaturated groups per 1,000 molecular weight units.

6. The metallized plastic molded product of claim 1, wherein said urethane modified polyvinyl compound used in said top coating layer has 1.8–10 polymerizable unsaturated groups per 1,000 molecular weight units.

7. A method for producing a metallized plastic molded product comprising subjecting a molded plastic substrate to (1) a base coating treatment, (2) a dry type metal film forming treatment, (3) an inter coating treatment and (4) a top coating treatment, characterized in that said inter coating treatment (3) comprises coating said base coated, metallized substrate with an ultraviolet curing composition comprising 5–80% by weight of a resin which contains 5–50% by weight of the repeating unit represented by the formula I:

$$\left[ -CH_2-\underset{\underset{\underset{R_3}{\diagdown}}{\overset{\overset{R_2}{\diagup}}{CON}}}{\overset{R_1}{\underset{|}{C}}}- \right] \tag{I}$$

wherein $R_1$ is H or $CH_3$, $R_2$ is H or $C_1$–$C_8$ alkyl, and $R_3$ is $C_1$–$C_8$ alkyl, and which has a molecular weight of 4,000–200,000, and 20–95% by weight of a compound having polymerizable unsaturated groups, and irradiating said coating with ultraviolet rays; and said top coating treatment (4) comprises coating said inter coated substrate with an ultraviolet curing composition comprising 40–90% by weight of a urethane modified polyvinyl compound or an epoxy modified polyvinyl compound and 10–60% by weight of a polyvinyl compound which has a molecular weight of 170–1,000 and contains at least 2 polymerizable unsaturated groups per molecule, and irradiating said coating with ultraviolet rays.

8. The method of claim 7, wherein said resin used in said inter coating layer has the repeating unit of said formula I wherein $R_1$ and $R_2$ are hydrogen and $R_3$ is octyl.

9. The method of claim 7, wherein said compound having polymerizable unsaturated groups and used in said inter coating layer is at least one compound selected from the group consisting of unsaturated polyester compounds, urethane modified polyvinyl compounds, epoxy modified polyvinyl compounds and polyvinyl compounds obtained by condensation of compounds having at least 2 hydroxyl groups and vinyl monomers having carboxyl groups.

10. The method of claim 7, wherein said compound having polymerizable unsaturated groups and used in said inter coating layer has 1.5–11.5 polymerizable unsaturated groups per 1,000 molecular weight units.

11. The method of claim 7, wherein said epoxy modified polyvinyl compound used in said top coating layer has 2–10 polymerizable unsaturated groups per 1,000 molecular weight units.

12. The method of claim 7, wherein said urethane modified polyvinyl compound used in said top coating layer has 1.8–10 polymerizable unsaturated groups per 1,000 molecular weight units.

* * * * *